April 15, 1969     S. M. COHEN ET AL     3,438,846
LAMINATES OF STYRENE-ACRYLONITRILE AND POLYURETHANE
Filed Nov. 20, 1967
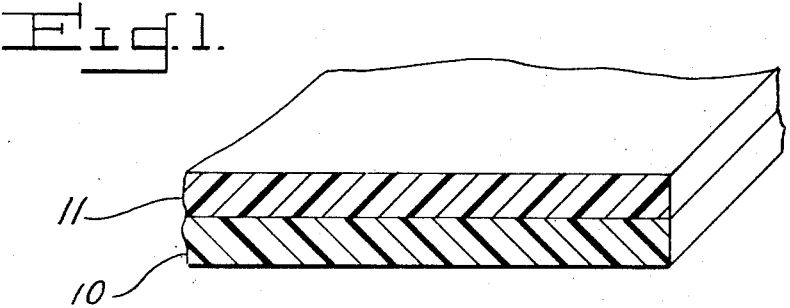
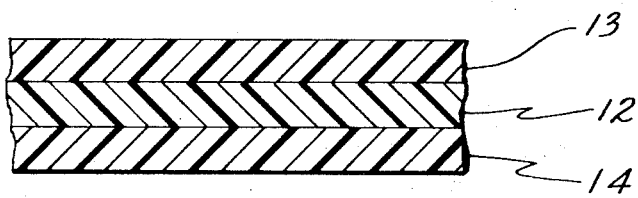
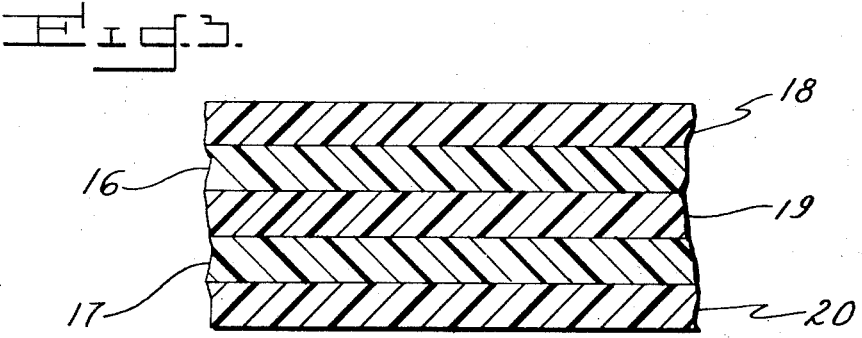
INVENTORS
MARSHALL J. DERBY
SAUL M. COHEN
BY John W. Klooster
ATTORNEY 3,438,846
LAMINATES OF STYRENE-ACRYLONITRILE AND POLYURETHANE
Saul M. Cohen, Springfield, and Marshall J. Derby, Littleton, Mass., assignors to Monsanto Company, St. Louis, Mo., a corporation of Delaware
Filed Nov. 20, 1967, Ser. No. 684,415
Int. Cl. B32b 27/08, 27/30, 31/04
U.S. Cl. 161—165                                     4 Claims

ABSTRACT OF THE DISCLOSURE

Transparent shatter-resistant plastic laminate structures employing alternate mutually bonded layers of sheets composed of styrene acrylonitrile polymers and sheets composed of polyurethanes.

BACKGROUND

Transparent, shatter-resistant laminates of the type wherein at least one transparent, rigid, brittle, shatterable sheet member having low impact strength is bonded to a transparent, flexible, yielding, shock absorbing sheet member having high impact strength are generally believed by those skilled in the art to owe their shatter-resistant properties to the fact that a flexible sheet in the laminate absorbs and disperses the deformation stresses produced in the rigid sheets by impact. Thus, when a crack forms (as through a shattering impact) in such a rigid sheet member, the crack is not propagated readily through such a flexible sheet member to the other sheets. Impact performance also benefits from a mechanism whereby at the crack situs and within an interval of time of the order of thousandths of a second, delamination occurs between such a rigid sheet member and such a flexible sheet member. This delamination releases, in effect, a relatively large amount of such flexible sheet member and enables it to absorb excess impact energy associated with a shattering force and thus prevent or resist penetration of propagation of the crack(s) through the laminate.

Heretofore, in the art of transparent, shatter-resistant laminate structures, only laminated safety glass has enjoyed substantial commercial acceptance. Safety glass, as those skilled in the art appreciate, is composed of two sheets of an inorganic glass bonded to one another by an interlayer of organic resinous material, particularly plasticized polyvinyl butyral.

All-organic, transparent, shatter-resistant laminates are unusual, probably owing both to the difficulties of obtaining appropriate yielding bond adhesion characteristics between a rigid organic sheet member and a flexible organic sheet member, and to the difficulties of obtaining appropriate light transparency characteristics in the finished laminate (especialy as regards the flexible organic sheet member). For example, transparent plastic sheeting formed of poly(styrene-co-acrylonitrile) is well known for its rigid, brittle, shatterable, low impact strength characteristics, but so far as we are aware, no one has heretofore made transparent, shatter-resistant laminate structures using such plastic sheeting. Observe that plasticized interlayers, such as plasticized polyvinyl butyral, should be avoided in these all-organic laminates because of solvent attack by the plasticizer on the styrene/acrylonitrile copolymer sheets.

We have now discovered all-organic, transparent, shatter-resistant laminates composed of sheets of styrene/acrylonitrile polymers and sheets of (unplasticized) elastomeric polyurethanes. Surprisingly, in addition to their transparency and impact properties, these laminates are thermoformable. Because of their all-organic character, their inherent low density, and their thermoformability, laminates of this invention are believed to have properties heretofore unknown to the art of transparent, shatter-resistant laminates.

DESCRIPTION OF THE DRAWINGS

The laminate structures of the present invention are illustrated by references to the attached drawings wherein:

FIGURE 1 is a diagrammatic, greatly enlarged vertical sectional view of an embodiment of the invention in its simplest form comprising a sheet 10 of polyurethane bonded on one face thereof with an adjoining sheet 11 of styrene/acrylonitrile polymer(s).

FIGURE 2 is a view similar to FIGURE 1 but showing an alternative embodiment of the invention in a preferred form comprising a sheet 12 of polyurethane having bonded to each opposed face thereof sheets 13 and 14 of styrene/acrylontrile polymer(s).

FIGURE 3 is a view similar to FIG. 1 but showing another alternative embodiment of the invention employing two sheets 16 and 17 of polyurethane and three sheets, 18, 19 and 20 of styrene/acrylonitrile polymer(s). In this embodiment, observe that sheet 19 is bonded on each of its faces to sheets 16 and 17, respectively, of polyurethane polymer(s). Laminates of the invention comprising as many alternate layers of interposed polyurethane sheets with sheets of poly(styrene-co-acrylonitrile) can be prepared as desired. In this way, tough and rigid transparent structures displaying good impact performance can be produced.

SUMMARY OF THE INVENTION

Briefly, this invention relates to organic, transparent, shatter-resistant, thermoformable laminates in which there are at least two different sheets of plastic material each bonded to the other. One sheet is composed of a first plastic transparent material consisting of copolymers of styrene and acrylontrile. The other sheet is composed of a second elastomeric transparent material which is composed of a polyurethane. The acrylonitrile/styrene polymerpolymer sheets, and the polyurethane sheets, are stacked together one to the other in deck fashion so that a polyurethane sheet is always adjacent to a styrene/acrylonitrile polymer sheet. The face of each polyurethane sheet which adjacent to the face of styrene/acrylonitrile polymer sheet is directly and continuously bonded thereto. In a given laminate of the present invention, there is always at least one polyurethane sheet and at least one poly(styrene-co-acrylonitrile) sheet.

Preferred laminates of the present invention are those wherein the elastomeric polyurethane sheet forms an interlayer between a pair of styrene/acrylonitrile polymer sheets. Typical laminates of the present invention employ one polyurethane interlayer between two sheets of poly(styrene-co-acrylonitrile).

For purposes of this invention, transparency is measured spectrophotometrically, and the term "transparent" or "transparency" has reference to at least 40 percent light transmission, preferably to at least 70 percent light transmission and still more preferably to at least 85 percent light transmission, as measured through a pair of dissimilar sheets bonded together in face-to-face engagement in accordance with the teachings of this invention, one sheet being the polyurethane, the other being the styrene/acrylonitrile polymer.

Similarly, for purposes of this invention, shatter-resistance may be measured in terms of impact resistance using a multiaxial impact tester consisting of a laminate or film clamping bar with holes, a hardened steel punch and a free falling weight. The hole diameter is 0.375 inch, the punch tip is hemispherical, and the punch diameter is 0.289 inch. The term "shatter-resistance" or "shatter-resistant" has reference to substantial prevention of penetration through the laminate layers and simultaneous substantial elimination of flying pieces of material from the laminate after impact as measured with (through) two sheets of poly(styrene-co-acrylonitrile) or combination thereof which are continuously initially bonded together over opposing faces through a sheet of polyurethane.

Similarly, for purposes of this invention, thermoformability is measured in terms of capacity of a laminate of this invention to be formed into a three-dimensional predetermined shape from a flat sheet form under the influence of appropriate heat and pressure without destroying the integrity (i.e. the continuity) of sheets or layers comprising the laminate composite. The term "thermoformability" or "thermoformable" has reference to the conventional thermoforming conditions used for styrene/acrylonitrile polymer which are typically carried out using temperatures ranging from about 175–205° C. while employing either subatmospheric pressures ranging from about 25–29 inches gauge or superatmospheric pressure of from about 15 to 100 p.s.i. Heating times of up to about three minutes are used. All measurements are conveniently made through at least a pair of dissimilar sheets bonded together in face-to-face engagement in accordance with the teachings of this invention, one sheet being the polyurethane polymer, the other being the styrene/acrylonitrile polymer.

The polyurethanes used in this invention are elastomers obtained from either aliphatic polyesters or aliphatic polyethers which are coupled through their terminal alcohol hydroxyl groups by diisocyanates. A low level of crosslinking is introduced at the end by incorporating traces of water, or a gylcol, or an aromatic diamine.

Aliphatic polyethers from poly(oxy-1,4-butylene) gylcols or poly(1,2-oxypropylene) glycols are typical. Molecular weights of 1000–3000 are typical.

Diisocyanates such as 2,4- and 2,6-tolyene diisocyanate, 1,5-naphthalene diisocyanate, p-phenylene diisocyanate, 4,4'-diphenyl methane diisocyanate, 4,4'-diphenylisopropylidene diisocyanate, 3,3'-dimethyl-4,4'-diphenylmethane diisocyanate and 3,3'-dimethyl-4,4'-diphenyl diisocyanate may be used. Low levels of crosslinking may be achieved by the terminal reactions of such additives as trace amounts of water, 1,4-butane diol and m-phenylenediamine. Other similar additives may be used, such as a trifunctional hydroxyl compound (like trimethylol ethane) or a trifunctional aromatic amine [like tris(aminophenyl) methane]. Thus, in general, the polyurethanes used in this invention are elastomeric and are composed of:

(1) Molecules of aliphatic polyester glycols or aliphatic polyether glycols each such molecule having a molecular weight of 1000–4000, (2) Said molecules being coupled by aromatic diisocyanates or aliphatic diisocyanates through the hydroxyl groups of said molecules to form urethane groups to form a linear polyurethane, and (3) The resulting coupled product being further reacted with at least one material selected from the class consisting of water, polyhydroxy compounds having molecular weights below about 300 and aromatic polyamines having molecular weights ranging from about 50–500 to such an extent that at least a 5 weight percent solution of the resulting polymer in dimethylacetamide can be prepared.

In forming the linear polyurethane, the mol ratio of the glycol component to the diisocyanate component should range from about 0.8 to 1.2. It will be appreciated that the polyurethane polymers used in this invention are block copolymers or multipolymers. It will, of course, be appreciated that the polyurethane polymers used to product a given laminate of the invention are so chosen that, when in a laminate of the invention, the laminate has a transparency, impace resistance, and thermoformability, all as described above. To prepare polyurethane sheets, conventional heat extrusion conditions are used. The preparation of such polyurethanes and their preparation into sheets is well known technology to those of ordinary skill in the art and does not form a part of the present invention.

In general, the thickness of the polyurethane sheeting employed in the present invention can range from about ¼ to 100 mils and preferably ranges from about 1 to 30 mils.

Styrene/acrylonitrile copolymers are interpolymers of monovinyl aromatic compounds, such as styrene; alkyl-substituted styrenes, such as, ortho-, meta- and para-methylstyrenes, 2,4 - dimethylstyrene, paraethylstyrene, etc.; halogen-substituted styrenes such as, e.g., ortho-, meta- and para - chlorostyrenes, or bromosyrenes, 2,4 - dichlorostyrene; and mixed halogen - plus alkyl-substituted styrenes such as 2-methyl-4-chlorostyrene, with ethylenically unsaturated nitriles. The term ethylenically unsaturated nitriles includes, in addition to acrylonitrile, such monomers as methacrylonitrile and mixtures thereof with acrylonitrile. In general, the amount of acrylonitrile to styrene can range from about 1 to about 50 weight percent and preferably ranges from about 15 to 30 percent. Such copolymers can be made by methods well known to those skilled in the art and are formed into sheets by methods well known to those skilled in the art (including extrusion and molding). For example, suitable extrusion grade poly(styrene-co-acrylonitrile) pellets are available from the Monsanto Company under the trade designations such as LNA–10, LNA–25, LNA–23 or the like. Such production of styrene/acrylonitrile copolymer and the formation thereof into sheets forms no part of the present invention.

In general, for use in this invention, one employs poly (styrene-co-acrylonitrile) sheets ranging in thickness from about 3 to 80 mils and preferably from about 5 to 25 mils.

To produce a laminate of this invention, it is necessary to bond a sheet of poly(styrene-co-acrylonitrile) to a sheet of polyurethane. Such a bonding can be accomplished as follows:

The technique can be termed thermal welding and invoices directly bonding the two different sheets of plastic together in accordance with this invention for fusion by heat and pressure only. By this technique, the different sheets are placed together and subjected to appropriate heat and pressure for a time sufficient to soften the inner facial surfaces and bond them together. Appropriate conditions for thermal welding involve the use of pressures of from about 5 to 100 p.s.i.; temperatures of from about 100 to 200° C. and times for simultaneous application of heat and pressure of from about 5 to 200 minutes, though these variables can be altered, as those skilled in the art will appreciate without departing from the spirit and scope of this invention. In general, one uses temperature, pressure and time conditions sufficient to bond the dissimilar sheets together so as to form the desired laminate structure.

It will be appreciated by those skilled in the art that the laminates of this invention can, in addition to being prepared in sheet form, be prepared in the form of tubes. Laminates of the invention can also be thermoformed into an indefinitely large variety of shaped articles of manufacture.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

*Example A.*—A sheet of styrene/acrylonitrile polymer is prepared from styrene/acrylonitrile pellets available from the Monsanto Company as LNA-20 by heat extrusion. For example, a suitable barrel temperature is about 205° C. and a suitable die temperature is about 225° C. The roll temperature is preferably about 85° C.

*Example B.*—A sheet of elastomeric polyurethane polymer is prepared from pelletized stock available from Mobay Chemical Company under the trade designation Texin 480A by heat extrusion. For example, suitable barrel and die temperatures range from about 150 to 200° C. The roll temperature is preferably about 80° C.

Using the above-indicated sheet materials of Examples A, B, and C, laminates of the invention are prepared as follows:

Examples 1 through 3

Samples cut from polymer sheets prepared as indicated above. Sample surfaces are cleaned with hexane and dried at about 80° C. in air for four hours. The cleaned samples are placed in face-to-face contact with one another and thermally welded together to form laminates of the invention. Thermal lamination conditions involve the use of a maximum temperature of about 175° C. achieved by raising the temperature 5° C. per minute until 175° C. is achieved while maintaining about 15 p.s.i. pressure for a time of about 10 minutes. The press is cooled to room temperature before the pressure is released. Details concerning individual samples so produced are summarized below in Table 1. In each case, the product is at least 70 percent transparent, shatter-resistant, and thermoformable.

TABLE 1

| Ex. No. | Styrene/Acrylonitrile Sheet | | Polyurethane Sheet | | Bonding | | | Laminate configuration of Fig. No. |
|---|---|---|---|---|---|---|---|---|
| | Thickness in mils | No. sheets | Thickness in mils | No. sheets | Pressure, p.s.i. | Temp., ° C. | Time (min.) | |
| 1 | 20 | 1 | 20 | 1 | 15 | 175 | 10 | 1 |
| 2 | 20 | 2 | 20 | 1 | 15 | 175 | 10 | 2 |
| 3 | 10 | 3 | 10 | 2 | 15 | 175 | 10 | 3 |

The product of each example is at least 70 percent transparent, shatter-resistant, thermoformable under conditions similar to polystyrene acrylonitrile.

What is claimed is:

1. An organic, transparent, shatter-resistant, thermoformable laminate comprising:
   (a) at least one sheet of a first transparent sheet composed of polymers of styrene/acrylonitrile,
   (b) at least one sheet of a second transparent sheet composed of copolymers of elastomeric polyurethanes said polyurethanes being composed of:
   (1) molecules of aliphatic polyester glycols or aliphatic polyether glycols each such molecule having a molecular weight of 1000–4000,
   (2) said molecules being coupled by aromatic diisocyanates or aliphatic diisocyanates through the hydroxyl groups of said molecules to form urethane groups, and
   (3) the resulting coupled product being further reacted with at least one material selected from the class consisting of water, polyhydroxy compounds having molecular weights below about 300 and aromatic polyamines having molecular weights ranging from about 50–500 to such an extent that at least a 5 weight percent solution of the resulting polymer in dimethylacetamide can be prepared,
   (c) said first sheets and said second sheets being positioned together adjacently in alternate face-to-face relationship one to another so that each interface between two such adjacent sheets is formed by a first sheet and a second sheet, and
   (d) each of said sheets being directly and continuously bonded to each of said second sheets at this interface therebetween.

2. The laminate of claim 1 wherein each of said first sheets ranges in thickness from about 3 to 80 mils.

3. The laminate of claim 1 wherein each of said second sheets ranges in thickness from about ¼ to 100 mils.

4. The laminate of claim 1 wherein there are two first sheets and one second sheet.

References Cited

UNITED STATES PATENTS 3,118,854  1/1964  Hess et al. _____ 161—165

ROBERT F. BURNETT, *Primary Examiner.*

WILLIAM J. VAN BALEN, *Assistant Examiner.*

U.S. Cl. X.R.

161—190